United States Patent
Kimura et al.

(10) Patent No.: US 8,588,715 B2
(45) Date of Patent: Nov. 19, 2013

(54) RECEIVER, WIRELESS COMMUNICATION SYSTEM, AND RECEIVING METHOD

(75) Inventors: Arinobu Kimura, Toyota (JP); Hiroki Okada, Toyota (JP); Hiroko Murakami, Toyota (JP); Kazuhiro Nakashima, Anjo (JP)

(73) Assignees: Toyota Jidosha Kabushiki Kaisha, Aichi-ken (JP); Denso Corporation, Kariya (JP)

( * ) Notice: Subject to any disclaimer, the term of this patent is extended or adjusted under 35 U.S.C. 154(b) by 0 days.

(21) Appl. No.: 13/578,899

(22) PCT Filed: Feb. 17, 2011

(86) PCT No.: PCT/IB2011/000305
§ 371 (c)(1),
(2), (4) Date: Aug. 14, 2012

(87) PCT Pub. No.: WO2011/101729
PCT Pub. Date: Aug. 25, 2011

(65) Prior Publication Data
US 2012/0309299 A1  Dec. 6, 2012

(30) Foreign Application Priority Data
Feb. 19, 2010  (JP) .................................. 2010-034901

(51) Int. Cl.
*H04B 1/18* (2006.01)
(52) U.S. Cl.
USPC ................... 455/151.2; 455/151.1; 455/150.1
(58) Field of Classification Search
USPC ........... 455/150.1, 151.1, 151.2, 69; 340/5.64
See application file for complete search history.

(56) References Cited

U.S. PATENT DOCUMENTS

| 5,152,006 A | * | 9/1992 | Klaus ............................. 455/574 |
| 5,739,874 A | * | 4/1998 | Badger et al. ................. 348/731 |
| 5,764,697 A | * | 6/1998 | Sakuma et al. ................ 375/239 |
| 5,903,226 A | * | 5/1999 | Suman et al. ............... 340/12.28 |
| 6,005,508 A | * | 12/1999 | Tsui ............................. 341/173 |

(Continued)

FOREIGN PATENT DOCUMENTS

| JP | 07-219721 A | 8/1995 |
| JP | 10-94065 A | 4/1998 |

(Continued)

OTHER PUBLICATIONS

International Search Report and Written Opinion for corresponding International Patent Application No. PCT/IB2011/000305 mailed Jun. 27, 2011.

*Primary Examiner* — Lewis West
(74) *Attorney, Agent, or Firm* — Sughrue Mion, PLLC

(57) ABSTRACT

A receiver (200) that receives a radio signal transmitted from a transmitter includes a receiving unit (2042) that receives a signal that is wirelessly transmitted from the transmitter at one of a plurality of transmission frequencies, a receiving frequency change determining unit (2048) that determines whether a receiving frequency is to be changed, based on the signal received by the receiving unit, and a communication error acceptance time setting unit (2046) that sets an acceptance time as a period of time for which communication errors after confirmation of a receiving operation are accepted, based on the signal received by the receiving unit. The communication error acceptance time setting unit sets the acceptance time to different periods of time, depending on whether the receiving frequency change determining unit determines that the receiving frequency is to be changed.

7 Claims, 7 Drawing Sheets

(56) References Cited

U.S. PATENT DOCUMENTS

| | | | |
|---|---|---|---|
| 6,323,566 B1 * | 11/2001 | Meier | 307/10.2 |
| 6,801,134 B1 * | 10/2004 | Juzswik | 340/12.51 |
| 7,035,364 B2 * | 4/2006 | Talwalkar et al. | 375/365 |
| 7,133,470 B2 * | 11/2006 | Menkhoff et al. | 375/326 |
| 7,224,755 B2 * | 5/2007 | Akahori | 375/344 |
| 7,499,507 B2 * | 3/2009 | Jaffe et al. | 375/341 |
| 7,533,571 B2 * | 5/2009 | Ariav et al. | 73/597 |
| 8,059,628 B2 * | 11/2011 | Bradley et al. | 370/343 |
| 8,138,894 B2 * | 3/2012 | Kato et al. | 340/12.28 |
| 8,428,792 B2 * | 4/2013 | Nakashima et al. | 701/2 |
| 2003/0013423 A1 * | 1/2003 | Nakano | 455/154.1 |
| 2006/0202798 A1 * | 9/2006 | Baumgartner et al. | 340/5.61 |
| 2008/0174446 A1 * | 7/2008 | Ghabra et al. | 340/825.01 |

FOREIGN PATENT DOCUMENTS

| | | |
|---|---|---|
| JP | 2005-158366 A | 6/2005 |
| JP | 2006-245643 A | 9/2006 |
| JP | 2008-190274 A | 8/2008 |
| JP | 2009-235867 A | 10/2009 |
| WO | 00/20712 A1 | 4/2000 |
| WO | 2007/082258 A2 | 7/2007 |

\* cited by examiner

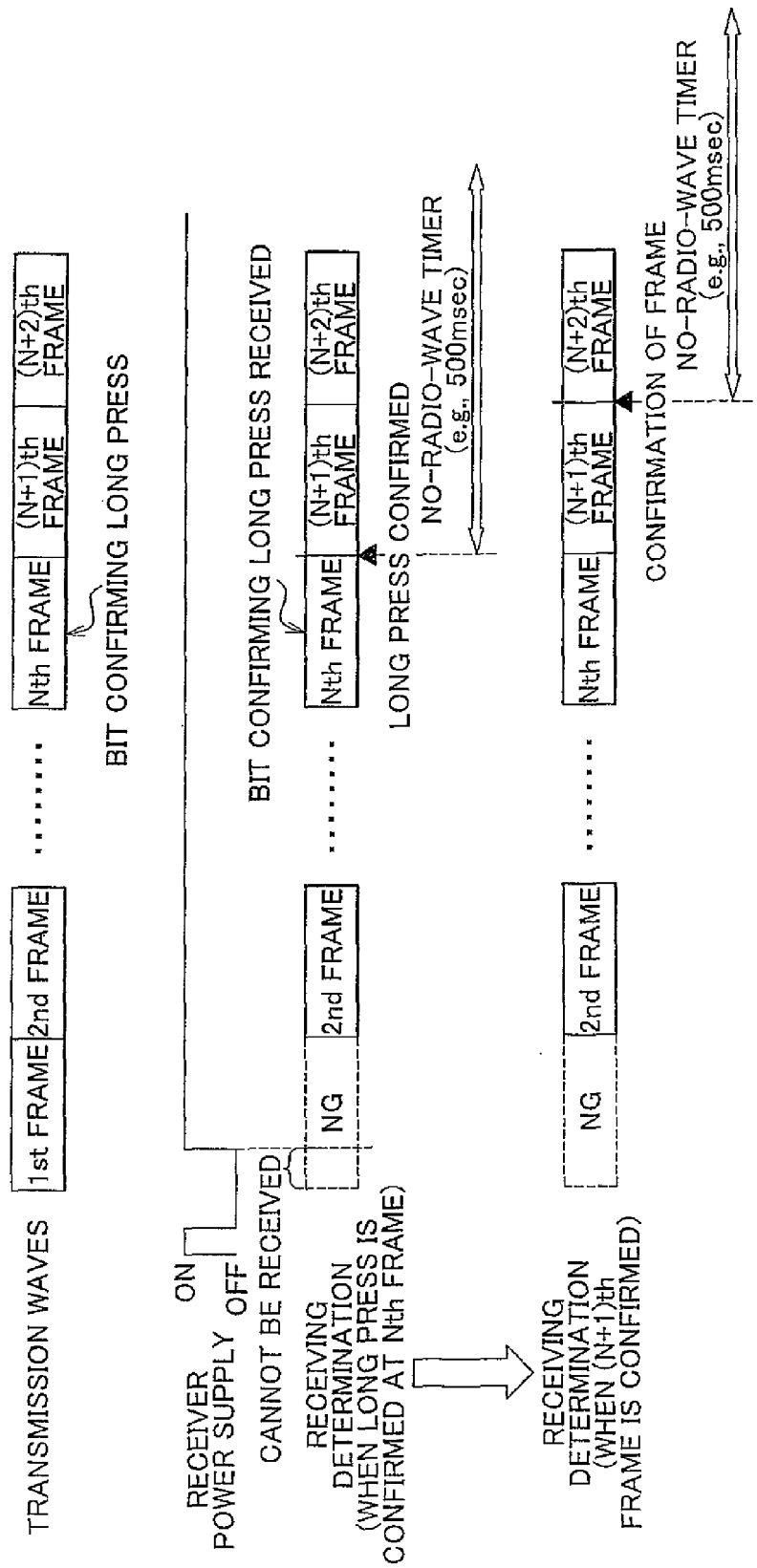

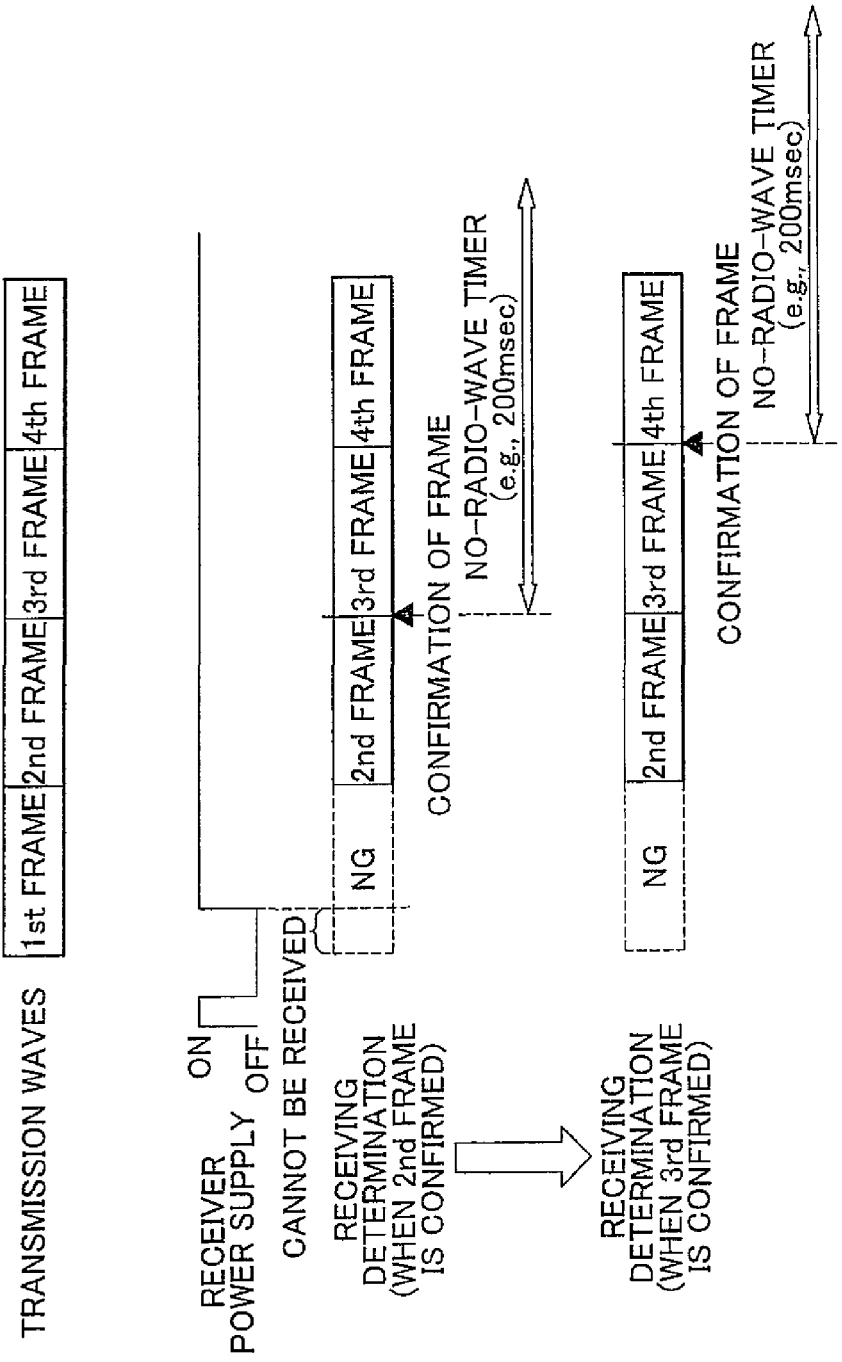

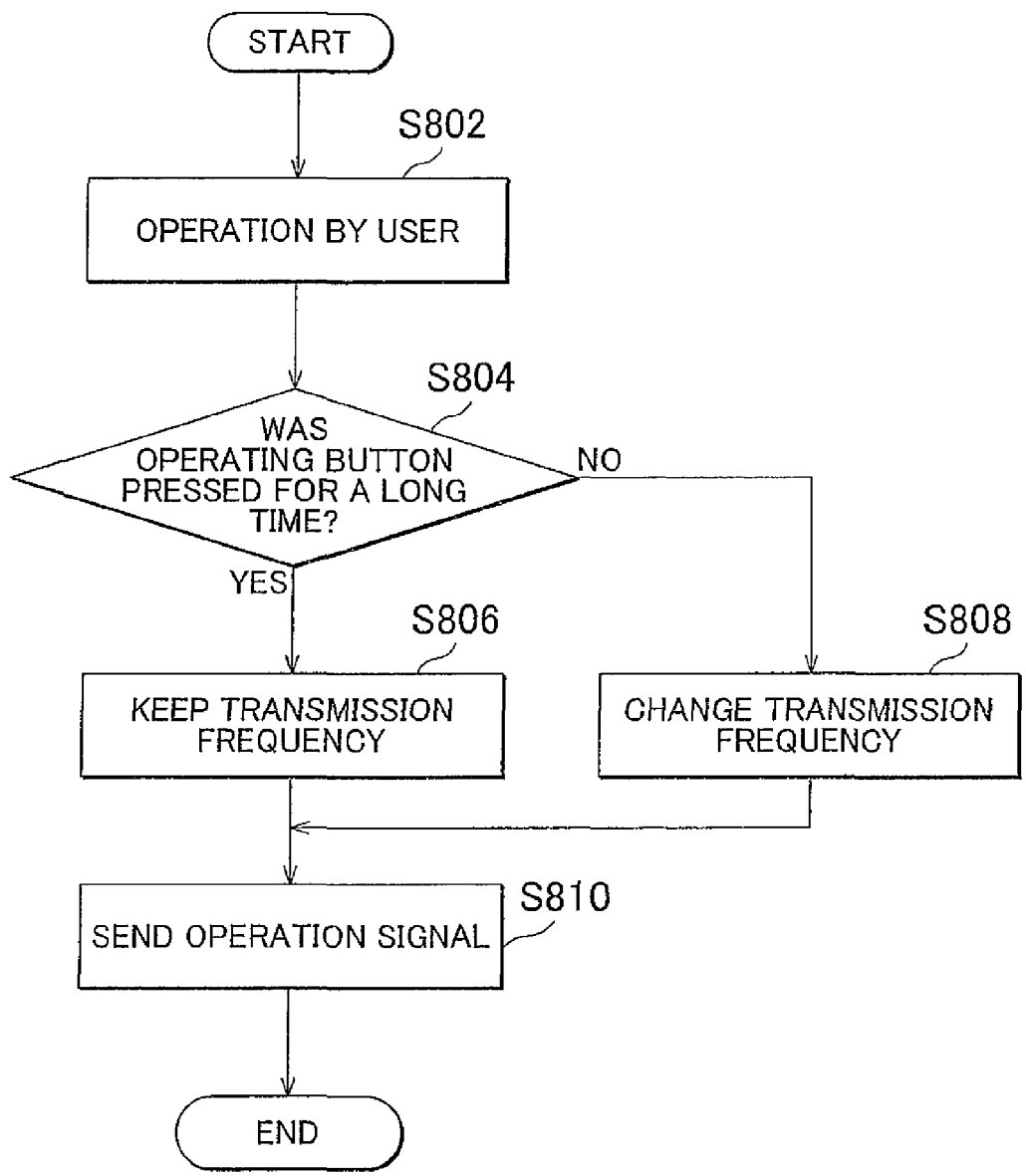

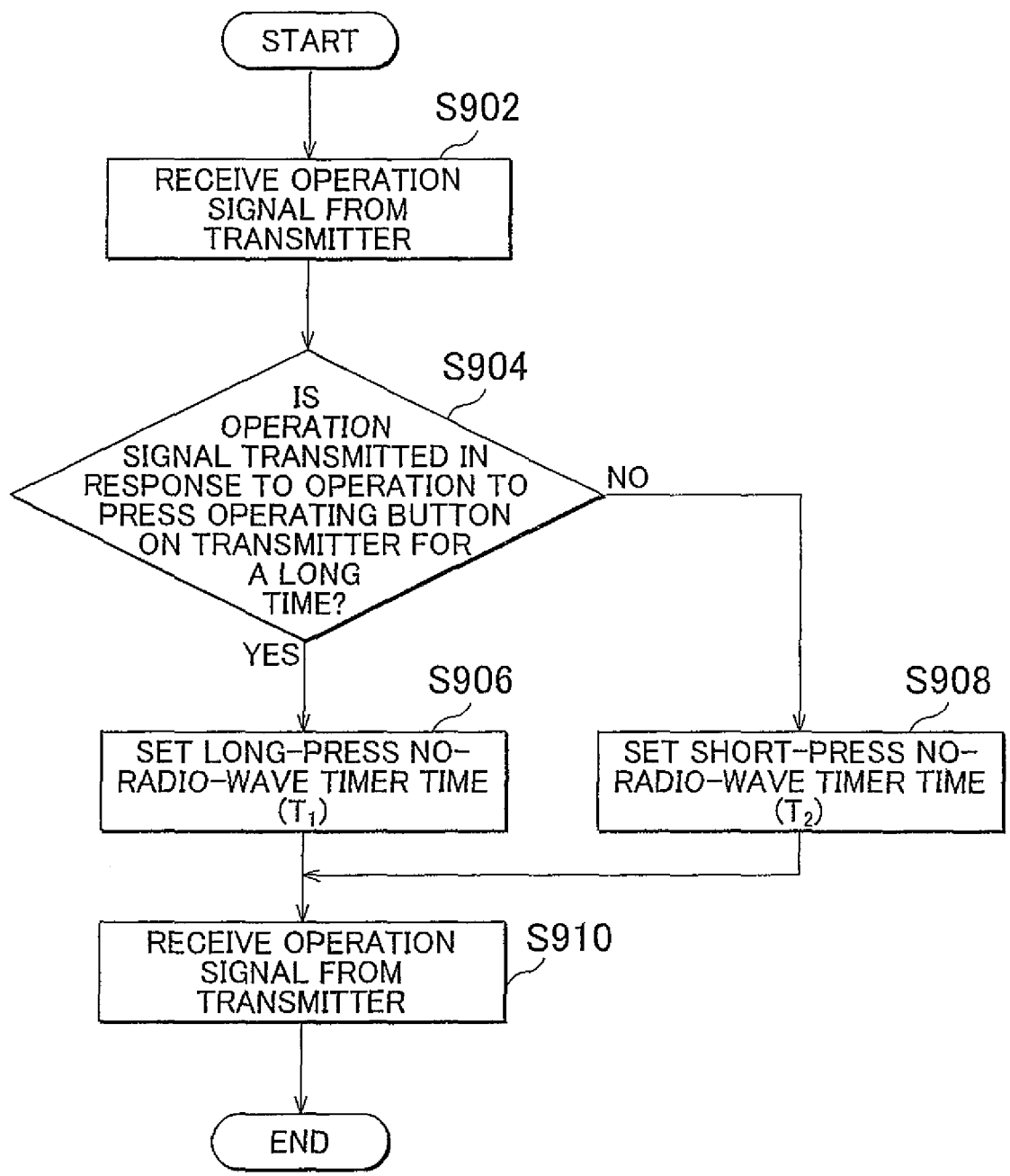

RECEIVER, WIRELESS COMMUNICATION SYSTEM, AND RECEIVING METHOD

BACKGROUND OF THE INVENTION

1. Field of the Invention

The invention relates to a wireless communication system.

2. Description of the Related Art

A multi-channel system capable of wireless communications at two or more frequencies has been introduced as one type of wireless communication system for a vehicle. The wireless communication system has a transmitter and a receiver, and is able to conduct wireless communications at two or more frequencies, between the transmitter and the receiver. In the multi-channel system, the transmitter has an operating button for switching the transmission frequency. For example, the frequency can be changed when the user presses the operating button for a short time, and the frequency that has been used continues to be used when the user presses the operating button for a long time.

If noise (interfering waves) occurs during communications at a certain frequency f1 between the transmitter and the receiver, and at least a part of the frequencies of the noise is equal to or overlaps the frequency f1, the communications between the transmitter and the receiver may not be established. With the introduction of the multi-channel system, even in the case where the communications between the transmitter and the receiver are not established, the transmitter switches the transmission frequency to a frequency f2, and the receiver switches the receiving frequency to the frequency f2, so that communications between the transmitter and the receiver can be established. For example, the multi-channel system is introduced as a remote keyless entry (RKE) system. In this case, if a door does not open even though an operating button on the transmitter is pressed, the user can change the transmission frequency by pressing the operating button of the transmitter for a short time, and can also change the receiving frequency of the receiver. With the transmission frequency and receiving frequency thus changed, the user is able to open the door by pressing the operating button again.

The wireless communication system is provided with a fixed period of time for which communication errors are ignored. The fixed period of time may be called "no-radio-wave timer" or "mask time". The transmitter sends substantially the same signal a plurality of times. Even in the case where a communication error occurs at a certain point in time, and the receiver fails to receive a transmission signal from the transmitter, the receiver can receive the signal transmitted from the transmitter at the next point in time if the no-radio-wave timer is started. For example, the receiver starts the no-radio-wave timer after confirmation of a certain frame, so as to save the next frame from a receiving error. The confirmation of the frame means that the frame can be successfully received. If the no-radio-wave timer is not started, the receiver continues to generate a signal indicative of no signal (the absence of signals) when a communication error occurs.

While the no-radio-wave timer is counting the set time, the receiver cannot change the standby frequency (or receiving frequency). This is because the no-radio-wave timer is started so as to save the signal transmitted from the transmitter from communication errors. Accordingly, even if an operation to change the frequency is performed by pressing the operating button on the transmitter for a short time, the no-radio-wave timer is in the middle of counting on the receiver side after confirmation of the frame immediately after the operation. Therefore, if the transmitter sends a signal at a frequency to which the transmission frequency has been changed, the receiver may not be able to receive the signal since the no-radio-wave timer is in the middle of counting.

SUMMARY OF THE INVENTION

The invention provides a receiver, a wireless communication system and a signal receiving method, which can reduce the time it takes the receiver to receive a signal from a transmitter, from the time at which the transmitter informs the receiver of switching of the frequency.

A first aspect of the invention is concerned with a receiver that receives a radio signal transmitted from a transmitter. The receiver includes a receiving unit that receives a signal that is wirelessly transmitted from the transmitter at one of a plurality of transmission frequencies, a receiving frequency change determining unit that determines whether a receiving frequency is to be changed, based on the signal received by the receiving unit, and a communication error acceptance time setting unit that sets an acceptance time as a period of time for which communication errors after confirmation of a receiving operation are accepted, based on the signal received by the receiving unit. The communication error acceptance time setting unit sets the acceptance time to different periods of time, depending on whether the receiving frequency change determining unit determines that the receiving frequency is to be changed.

A second aspect of the invention is concerned with a wireless communication system including a transmitter, and a receiver that receives a radio signal transmitted from the transmitter. In the wireless communication system, the transmitter wirelessly transmits a signal at one of a plurality of transmission frequencies, and the receiver includes a receiving unit that receives the signal wirelessly transmitted from the transmitter, a receiving frequency change determining unit that determines whether a receiving frequency is to be changed, based on the signal received by the receiving unit, and a communication error acceptance time setting unit that sets an acceptance time as a period of time for which communication errors after confirmation of a receiving operation are accepted, based on the signal received by the receiving unit. The communication error acceptance time setting unit sets the acceptance time to different periods of time, depending on whether the receiving frequency change determining unit determines that the receiving frequency is to be changed.

A third aspect of the invention is concerned with a signal receiving method according to which a receiver receives a radio signal transmitted from a transmitter. The signal receiving method includes a receiving step of receiving a signal that is wirelessly transmitted from the transmitter at one of a plurality of transmission frequencies, a receiving frequency change determining step of determining whether a receiving frequency is to be changed, based on the signal received in the receiving step, and a communication error acceptance time setting step of setting an acceptance time as a period of time for which communication errors after confirmation of a receiving operation are accepted, based on the signal received in the receiving step. In the communication error acceptance time setting step, the acceptance time is set to different periods of time, depending on whether it is determined in the receiving frequency change determining step that the receiving frequency is to be changed.

According to the receiver, wireless communication system and signal receiving method of the invention, the time it takes the receiver to receive the signal from the transmitter, from the time at which the transmitter informs the receiver of switching of the frequency, can be reduced or shortened.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is an explanatory view illustrating the operation (No. 1) of the receiver according to the embodiment of FIG. 1;

FIG. 7 is an explanatory view illustrating the operation (No. 2) of the receiver according to the embodiment of FIG. 1;

FIG. 8 is a flowchart illustrating the operation of the transmitter according to the embodiment of FIG. 1; and FIG. 9 is a flowchart illustrating the operation of the receiver according to the embodiment of FIG. 1.

DETAILED DESCRIPTION OF THE PREFERRED EMBODIMENTS

Figure 1:
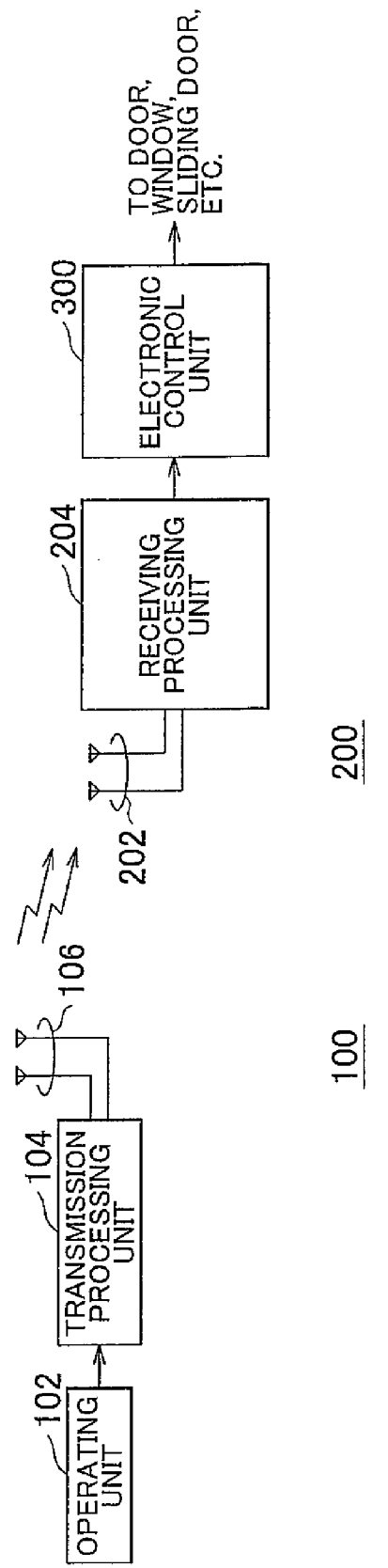
FIG. 1 is an explanatory view showing one example of wireless communication system according to one embodiment of the invention.

One embodiment of the invention will be described with reference to the drawings. In all of the drawings used for explaining the embodiment, the same reference numerals are used to identify components or elements having the same functions, and these components or elements will not be repeatedly explained.

Wireless Communication System FIG. 1 shows a wireless communication system according to the embodiment of the invention.

The wireless communication system of this embodiment has a transmitter 100 and a receiver 200. The wireless communication system is used for a vehicle, for example, and may be used as a remote keyless entry (RKE) system, for example. The transmitter 100 may be a portable device. The receiver 200 is installed on the vehicle. The portable device sends an operation signal, such as a command for opening or closing a door, opening or closing a window, or opening or closing a sliding door, to the vehicle. The receiver 200 may be a vehicle-installed electronic device. The electronic device transmits a command signal received from the portable device, to an electronic control unit (ECU).

The receiver 200 sets a fixed period of time for which the receiver 200 ignores communication errors. In the following description, the fixed period of time will be called "no-radio-wave timer time". The no-radio-wave timer time may also be called "mask time".

In the wireless communication system of this embodiment, it is possible to switch the transmission frequency of the operation signal from one frequency to another by pressing an operating button provided on the transmitter 100 for a short time. The above-mentioned mask time is preferably set to a short period of time when the transmission frequency of the operation signal is switched or changed, so that the receiver 200 can receive the operation signal at an earlier opportunity at the frequency to which the transmission frequency was changed by the transmitter 100.

Also, it is possible to "lock" or "unlock" a door by pressing the operating button provided on the transmitter 100 for a short time, for example. Since a motor for opening or closing the door operates only for a moment to "lock" or "unlock" the door, noise occurs over a short period of time, and the noise has an influence on a narrow range. Accordingly, the no-radio-wave timer time may be a short period of time when the door is "locked" or "unlocked". This is because communication errors are less likely or unlikely to occur since the noise occurs over a short period of time, and the range influenced by the noise is narrow or small.

Also, it is possible to open and close a "sliding door" and/or a vehicle window, by pressing the operating button provided on the transmitter 100 for a long time. Since a motor for opening or closing the "sliding door" and/or a motor for opening or closing the vehicle window is/are kept operating for a given period of time when the "sliding door" and/or the vehicle window is/are opened or closed, noise occurs in a long period of time. In this case, the noise is discontinuously or intermittently generated by the motor. Accordingly, the mask time is preferably set to a long period of time when the "sliding door" and/or the vehicle window is/are opened or closed. This is because the noise is kept discontinuously generated over a long period of time, and communication errors are likely to occur in the long time period.

In the wireless communication system of this embodiment, when the operating button provided on the transmitter 100 is pressed for a short time so as to change the transmission frequency, the receiver 200 sets the no-radio-wave timer time to a short period of time. When the operating button on the transmitter 100 is pressed for a short time, the transmitter 100 changes the signal transmission frequency. By setting the no-radio-wave timer time to a short period of time when an operation to change the transmission frequency is performed, it is possible to reduce time it takes from the time when the receiver 200 is informed by the transmitter of the change of the transmission frequency, to the time when the receiver 200 changes the standby frequency.

Transmitter The transmitter 100 of this embodiment has an operating unit 102. The operating unit 102 has an operating member in the form of an operating button. The operating member is not limited to the operating button, provided that it produces a signal for operating a corresponding part of the vehicle. When the operating button is pressed, the operating unit 102 generates a command (hereinafter called "operation signal producing signal") to produce an operation signal as a command to open or close a door, open or close a window, or open or close a sliding door, to a transmission processing unit 104. With the operation signal producing signal thus received by the transmission processing unit 104, the transmitter 100 is able to send the operation signal as a command to open or close a door, open or close a window, or open or close a sliding door.

Also, the operating unit 102 determines, based on the length of time for which the operating button is kept pressed by the user, whether the transmission frequency of the signal to be transmitted should be switched or changed. If it is determined that the transmission frequency of the signal to be transmitted should be switched or changed, the operating unit 102 generates a command (hereinafter called "transmission frequency switching signal") to switch the transmission frequency, to the transmission processing unit 104. In this embodiment, the transmitter 100 has two transmission frequencies (frequency f1, frequency f2), and the case where the transmission frequency is switched between frequency f1 and frequency f2 will be described. For example, if the user presses the operating button for a short time in a condition where the transmission frequency is set at frequency f1, the transmission frequency is switched to or set to frequency f2. If the user presses the operating button for a short time in a condition where the transmission frequency is set at frequency f2, the transmission frequency is switched to or set to frequency f1.

The transmitter 100 of this embodiment has the transmission processing unit 104. The transmission processing unit 104 is connected to the operating unit 102. The above-mentioned operation signal producing signal is transmitted from the operating unit 102 to the transmission processing unit 104. Also, the transmission frequency switching signal is transmitted from the operating unit 102 to the transmission processing unit 104.

Figure 2:
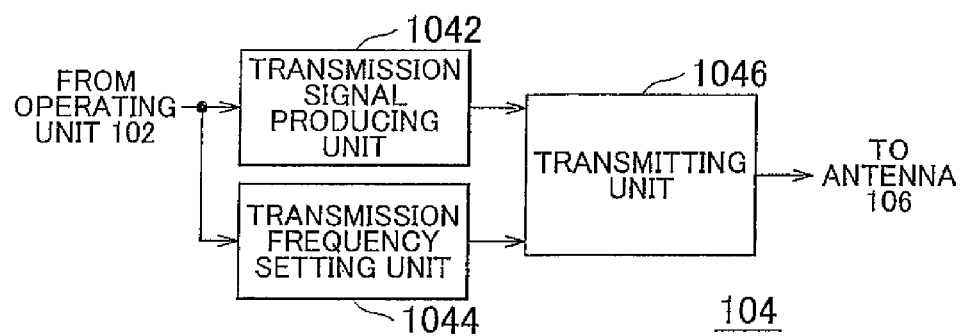
FIG. 2 is a functional block diagram showing a transmitter according to the embodiment of FIG. 1.

FIG. 2 shows one example of the functions of the transmission processing unit 104.

The transmission processing unit 104 has a transmission signal producing unit 1042. The transmission signal producing unit 1042 is connected to the operating unit 102. The transmission signal producing unit 1042 receives an operation signal producing signal from the operating unit 102. The transmission signal producing unit 1042 produces an operation signal, based on the operation signal producing signal. The operation signal is a signal for giving a command to open or close a door, open or close a window, or open or close a sliding door, for example. If the operation signal is produced when the user presses the operating button for a long time, a flag bit may be set at a given position of the operation signal. The receiver 200 can determine, depending on the presence of the flag bit, whether the operating button was pressed for a long time. The operation signal produced by the transmission signal producing unit 1042 is fed to a transmitting unit 1046.

The transmission signal producing unit 1042 also receives a transmission frequency switching signal from the operating unit 102. The transmission signal producing unit 1042 does not set a flag bit at a given position of the operation signal received when the transmission frequency switching signal is received. The receiver 200 can determine, based on the absence of the flag bit, whether the operating button was pressed for a short time. The transmission frequency switching signal produced by the transmission signal producing unit 1042 is fed to the transmitting unit 1046.

The transmission processing unit 104 has a transmission frequency setting unit 1044. The transmission frequency setting unit 1044 is connected to the operating unit 102. The transmission frequency setting unit 1044 receives a transmission frequency switching signal from the operating unit 102. The transmission frequency setting unit 1044 sets a transmission frequency based on the transmission frequency switching signal. For example, if the transmission frequency setting unit 1044 receives a transmission frequency switching signal in a condition where the transmission frequency is set at frequency f1, the transmission frequency is switched to or set to frequency f2. If the transmission frequency setting unit 1044 receives a transmission frequency switching signal in a condition where the transmission frequency is set at frequency f2, the transmission frequency is switched to or set to frequency f1. It is, however, to be noted that the transmission processing unit 104 switches or changes the transmission frequency after the transmitting unit 1046 sends an operation signal to inform the receiver 200 of switching of the transmission frequency. The operation signal to inform the receiver 200 of switching of the transmission frequency has no flag bit set at a given position thereof. Even if the operation signal to inform the receiver 200 of switching of the transmission frequency is transmitted at the frequency to which the transmission frequency has been switched, the receiver 200 cannot receive the operation signal to inform the receiver 200 of switching of the transmission frequency. For example, the transmission frequency may be switched or changed after a lapse of time it is supposed to take to transmit the operation signal to inform the receiver 200 of switching of the transmission frequency, from the time when the transmission frequency switching signal is received from the operating unit 102. In another example, the transmission frequency setting unit 1044 may be informed from the transmitting unit 1046 that the operation signal to inform the receiver 200 of switching of the transmission frequency has been transmitted to the receiver 200. In this case, the transmission frequency setting unit 1044 may switch the transmission frequency after it is informed of the transmission of the above operation signal. The transmission frequency set by the transmission frequency setting unit 1044 is fed to the transmitting unit 1046.

The transmission processing unit 104 has the transmitting unit 1046. The transmitting unit 1046 is connected to the transmission signal producing unit 1042 and the transmission frequency setting unit 1044. The transmitting unit 1046 wirelessly transmits a transmission signal produced by the transmission signal producing unit 1042, at the frequency set by the transmission frequency setting unit 1044. The operation signal that informs the receiver 200 of switching of the transmission frequency is wirelessly transmitted to the receiver 200 at the transmission frequency that has not been switched or changed.

Figure 3:
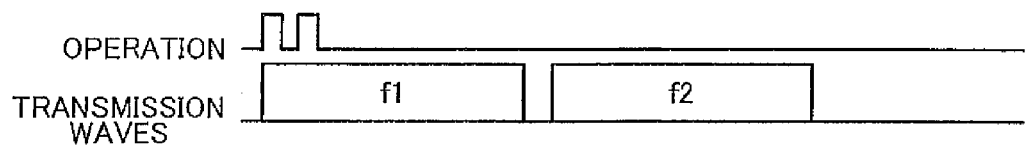
FIG. 3 is an explanatory view showing one example of signal transmitted from the transmitter according to the embodiment of FIG. 1.

FIG. 3 shows one example of signal transmitted by the transmitter 100 of this embodiment. In FIG. 3, the horizontal axis indicates time. FIG. 3 shows an example of signal that is transmitted when the user presses an operating button for a short time. For example, radio waves transmitted when the user presses the operating button twice for a short time cause the transmission frequency to be changed from frequency f1 to frequency f2. When the transmission frequency is switched, the period of time for which radio waves are transmitted at the frequency prior to switching from the time when the operation to switch the transmission frequency is performed, and the period of time from the end of transmission at the frequency prior to switching to the start of transmission at the frequency after switching, may be set in advance.

The transmitter 100 of this embodiment has an antenna 106. The antenna 106 is connected to the transmission processing unit 104. The transmission signal produced by the transmission processing unit 104 is wirelessly transmitted via the antenna 106, at the frequency set by the transmission processing unit 104. The transmission signal may be an operation signal in which a flag bit is set at a given position thereof, or an operation signal in which no flag bit is set.

Receiver The receiver 200 of this embodiment has an antenna 202. The antenna 202 receives a radio signal transmitted from the transmitter 100. The signal thus received is fed to a receiving processing unit 204.

The receiver 200 of this embodiment has the receiving processing unit 204. The receiving processing unit 204 is connected to the antenna 202.

Figure 4:
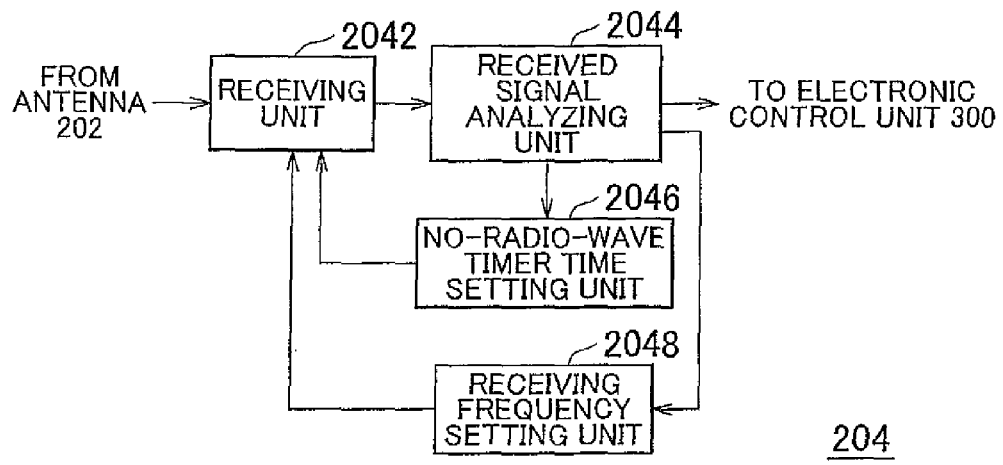
FIG. 4 is a functional block diagram showing a receiver according to the embodiment of FIG. 1.

FIG. 4 shows the function of the receiving processing unit 204.

The receiving processing unit 204 has a receiving unit 2042. The receiving unit 2042 is connected to the antenna 202. The receiving unit 2042 receives a radio signal via the antenna 202. The receiving unit 2042 receives the radio signal transmitted from the transmitter 100, based on a frequency set by a receiving frequency setting unit 2048, and the no-radio-wave timer time set by a no-radio-wave timer time setting unit 2046. The signal thus received is fed to a received signal analyzing unit 2044.

The receiving processing unit 204 has the received signal analyzing unit 2044. The received signal analyzing unit 2044 is connected to the receiving unit 2042. The received signal analyzing unit 2044 analyzes the received signal fed from the receiving unit 2042. For example, the received signal includes an operation signal. The received signal analyzing unit 2044 transmits the operation signal to an electronic control unit 300.

Also, the received signal analyzing unit 2044 determines whether the received signal fed from the receiving unit 2042 was transmitted from the transmitter 100 because the user pressed an operating button for a long time. For example, a flag bit may be set at a given position of the signal transmitted when the user presses the operating button for a long time. If a flag bit is set at a given bit position of the received signal, the received signal analyzing unit 2044 determines that the received signal was transmitted because the user pressed the operating button for a long time. When it is determined that the received signal was transmitted because the operating button was pressed for a long time, the received signal analyzing unit 2044 generates information (hereinafter called "long-press information") that the received signal was transmitted because the operating button was pressed for a long time, to the no-radio-wave timer time setting unit 2046.

If, on the other hand, no flag bit is set at a given bit position of the received signal, the received signal analyzing unit 2044 determines that the signal was transmitted because the user pressed the operating button for a short time. When it is determined that the signal was transmitted because the operating button was pressed for a short time, the received signal analyzing unit 2044 generates information (hereinafter called "short-press information") that the received signal was transmitted because the operating button was pressed for a short time, to the no-radio-wave timer time setting unit 2046. If no flag bit is set at a given bit position of the received signal, the received signal analyzing unit 2044 also generates a command to switch the transmission frequency, to the receiving frequency setting unit 2048.

The receiving processing unit 204 has the no-radio-wave timer time setting unit 2046. The no-radio-wave timer time setting unit 2046 is connected to the received signal analyzing unit 2044 and the receiving unit 2042. The no-radio-wave timer time setting unit 2046 sets the no-radio-wave timer time, based on the long-press information or short-press information received from the received signal analyzing unit 2044. For example, the no-radio-wave timer time to be set when short-press information is received (which will be called "short-press no-radio-wave timer time") is set to a shorter period of time than the no-radio-wave timer time to be set when long-press information is received (which will be called "long-press no-radio-wave timer time"). By setting the short-press no-radio-wave timer time to a shorter period of time than the long-press no-radio-wave timer time, the length of time it takes from the time at which the short-press information is received from the transmitter 100 to the time at which the standby frequency is switched or changed can be reduced; therefore the time in which communication errors occur because the standby frequency has not been switched can be reduced. The no-radio-wave timer time setting unit 2046 feeds the thus set no-radio-wave timer time (the long-press no-radio-wave timer time or short-press no-radio-wave timer time) to the receiving unit 2042.

The receiving processing unit 204 has the receiving frequency setting unit 2048. The receiving frequency setting unit 2048 is connected to the received signal analyzing unit 2044 and the receiving unit 2042. The received frequency setting unit 2048 receives a command to switch the transmission frequency, from the received signal analyzing unit 2044. The receiving frequency setting unit 2048 sets the receiving frequency according to the command. The receiving frequency set by the receiving frequency setting unit 2048 is fed to the receiving unit 2042.

Figure 5:
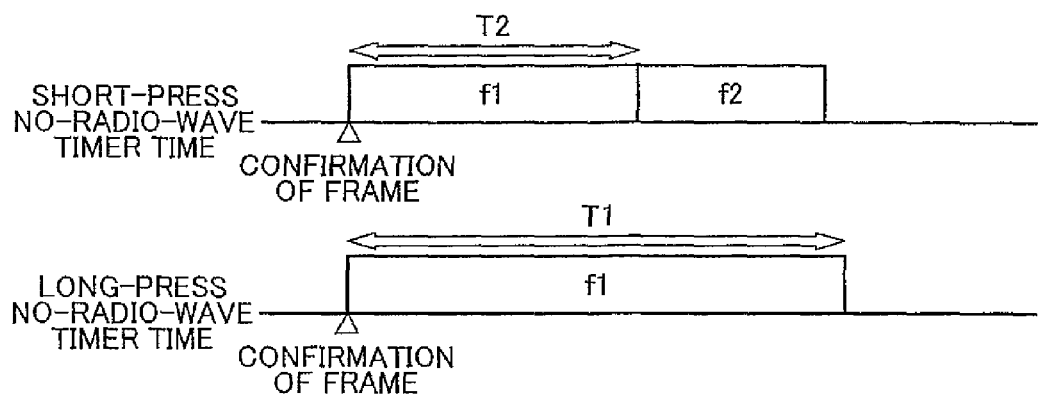
FIG. 5 is an explanatory view showing one example of signals received by the receiver according to the embodiment of FIG. 1.

FIG. 5 shows an example of setting of the no-radio-wave timer time and the standby frequency. In FIG. 5, "T2" indicates the short-press no-radio-wave timer time, and "T1" indicates the long-press no-radio-wave timer time.

When the no-radio-wave timer time setting unit 2046 sets the no-radio-wave timer time to the short-press no-radio-wave timer time T2 while the standby frequency is set at frequency f1, the short-press no-radio-wave timer time T2 is set after a certain frame is confirmed. The short-press no-radio-wave timer time T2 is set upon confirmation of each frame, until a given number of frames are received. When the given number of frames are received, the standby frequency is switched to frequency f2.

When the no-radio-Wave timer time setting unit 2046 sets the no-radio-wave timer time to the long-press no-radio-wave timer time T1 while the standby frequency is set at frequency f1, the long-press no-radio-wave timer time T1 is set after a certain frame is confirmed. The long-press no-radio-wave timer time T1 is set upon confirmation of each frame, until a given number of frames are received.

The operation signal analyzed by the received signal analyzing unit 2044 is transmitted to the electronic control unit 300. The electronic control unit 300 performs an operation corresponding to the operation signal. For example, if the operation signal is a command to open or close a door, the electronic control unit 300 performs control for locking or unlocking the door. If the operation signal is a command to open or close a window, the electronic control unit 300 performs control for opening or closing the window. If the operation signal is a command to open or close a sliding door, the electronic control unit 300 performs control for opening or closing the sliding door.

Receiving Process (No. 1) As described above, the receiving unit 2042 receives a radio signal transmitted from the transmitter 100, based on the frequency set by the receiving frequency setting unit 2048, and the no-radio-wave timer time set by the no-radio-wave timer time setting unit 2046.

FIG. 6 illustrates processing executed by the receiving unit 2042 when the long-press no-radio-wave timer time is set by the no-radio-wave timer time setting unit 2046. In FIG. 6, the lateral direction indicates time.

The long-press no-radio-wave timer time is set to a longer period of time than the short-press no-radio-wave timer time. For example, the short-press no-radio-wave timer time may be set to 200 ms, whereas the long-press no-radio-wave timer time may be set to 500 ms. The set periods of 200 ms and 500 ms are mere examples, and may be changed when appropriate.

The radio waves transmitted from the transmitter 100 include a plurality of frames. Each of the plurality of frames may have substantially the same time width. In FIG. 6, the first, second, . . . , Nth, (N+1)th, and (N+2)th frames are shown by way of example (where N is an integer larger than 0 (N>0)).

If the user presses an operating button on the transmitter 100 for a long time, an operation signal in which a flag bit is set at a given position is transmitted from the transmitter 100. For example, the flag bit is set at a give position of the Nth frame.

For example, the power supply of the receiver 200 is turned on during transmission of the first frame from the transmitter 100. Since the power supply is turned on in the middle of transmission of the first frame, the receiver 200 is not able to successively receive the first frame, and the first frame becomes an NG frame.

The receiver 200 receives the second and subsequent frames, and determines whether a flag bit is included in the frames. If the receiver 200 detects a flag bit included in the frames, it starts a long-press no-radio-wave timer (i.e., it confirms the user's operation to press the operating button for a long time). In the example shown in FIG. 6, a flag bit is detected in the Nth frame. While the long-press no-radio-wave timer is counting the set time, noise the received signal is masked even if noise is received and no normal signal is received from the transmitter 100. In other words, during operation (counting) of the long-press no-radio-wave timer, no communication errors are detected even if no normal signal (operation signal) is received from the transmitter 100 due to an influence of noise. Since substantially the same signal is transmitted a plurality of times from the transmitter 100, the receiver 200 can receive frames that would result in receiving errors, during operation of the long-press no-radio-wave timer.

If it is confirmed from the Nth frame that the operating button was pressed for a long time, the receiver 200 starts the no-radio-wave timer upon confirmation of each frame. For example, if the (N+1)th frame is received and confirmed, the long-press no-radio-wave timer is set. While the no-radio-wave timer is counting the set time, the received signal is masked even if noise is received and no normal signal is received from the transmitter 100. In other words, during operation (counting) of the no-radio-wave timer, no communication errors are detected even if no normal signal (operation signal) is received from the transmitter 100 due to an influence of noise. Since substantially the same signal is transmitted a plurality of times from the transmitter 100, the receiver 200 can receive frames that would result in receiving errors, during operation of the no-radio-wave timer.

Subsequently, substantially the same processing is continued.

Receiving Process (No. 2) As described above, the receiving unit 2042 receives a radio signal transmitted from the transmitter 100, based on the frequency set by the receiving frequency setting unit 2048, and the no-radio-wave timer time set by the no-radio-wave timer time setting unit 2046.

FIG. 7 illustrates processing executed by the receiving unit 2042 when the short-press no-radio-wave timer time is set by the no-radio-wave timer time setting unit 2046. In FIG. 7, the lateral direction indicates time.

The short-press no-radio-wave timer time is set to a shorter period of time than the long-press no-radio-wave timer time. For example, the long-press no-radio-wave timer time may be set to 500 ms, whereas the short-press no-radio-wave timer time may be set to 200 ms. The set periods of 200 ms and 500 ms are mere examples, and may be changed when appropriate.

As described above, the radio waves transmitted by the transmitter 100 include a plurality of frames. Each of the plurality of frames may have substantially the same time width. In FIG. 7, the first, second, third and fourth frames are shown by way of example.

If the user presses an operating button on the transmitter 100 for a short time, an operation signal in which no flag bit is set at a given position is transmitted from the transmitter 100. For example, no flag bit is set at a given position of the second frame.

For example, the power supply of the receiver 200 is turned on during transmission of the first frame from the transmitter 100. Since the power supply is turned on in the middle of transmission of the first frame, the receiver 200 is not able to successively receive the first frame, and the first frame becomes an NG frame.

The receiver 200 receives the second and subsequent frames, and determines whether a flag bit is included in the frames. If the receiver 200 detects no flag bit in the frames, it starts a short-press no-radio-wave timer. In the example shown in FIG. 7, no flag bit is set in the second frame. While the short-press no-radio-wave timer is counting the set time, the received signal is masked even if noise is received and no normal signal is received from the transmitter 100. In other words, during operation (counting) of the short-press no-radio-wave timer, no communication errors are detected even if no normal signal (operation signal) is received from the transmitter 100 due to an influence of noise. Since substantially the same signal is transmitted a plurality of times from the transmitter 100, the receiver 200 can receive frames that would result in receiving errors, during operation of the short-press no-radio-wave timer.

If it is confirmed from the second frame that the operating button was pressed for a short time, the receiver 200 starts the short-press no-radio-wave timer upon confirmation of each frame. For example, if the third frame is received and confirmed, the short-press no-radio-wave timer is set. While the no-radio-wave timer is counting the set time, the received signal is masked even if noise is received and no normal signal is received from the transmitter 100. In other words, during operation (counting) of the short-press no-radio-wave timer, no communication errors are detected even if no normal signal (operation signal) is received from the transmitter 100 due to an influence of noise. Since substantially the same signal is transmitted a plurality of times from the transmitter 100, the receiver 200 can receive frames that would result in receiving errors, during operation of the no-radio-wave timer.

Subsequently, substantially the same processing is continued.

Operation of Transmitter The operation of the wireless communication system of this embodiment will be described.

FIG. 8 illustrates the operation of the transmitter 100.

The user performs an operation (step S802). For example, the user presses an operating button included in the operating unit 102.

The transmitter 100 determines whether the user pressed the operating button for a long time (step S804). For example, the operating unit 102 determines whether the operating button was pressed by the user for a long time.

If the operating button was pressed for a long time (step S804: YES), the transmitter 100 does not change the transmission frequency (step S806). For example, if it is determined that the operating button was pressed by the user for a long time, the operating unit 102 does not feed a transmission frequency switching signal to the transmission signal producing unit 1042. Also, the operating unit 102 does not feed a transmission frequency switching signal to the transmission frequency setting unit 1044. Since the transmission frequency setting unit 1044 does not receive the transmission frequency switching signal from the operating unit 102, the unit 1044 maintains the transmission frequency that has been set.

If the operating button was not pressed for a long time (step S804: NO), in other words, if the operating button was pressed for a short time, the transmitter 100 changes the transmission frequency (step S808). For example, if it is not determined that the operating button was pressed by the user for a long time, the operating unit 102 feeds a transmission frequency switching signal to the transmission signal producing unit 1042, and also feeds a transmission frequency switching signal to the transmission frequency setting unit 1044. The transmission signal producing unit 1042 produces an operation signal (an operation signal that informs the receiver 200 of switching of the transmission frequency) in which no flag bit is set at a given position. The transmission frequency setting unit 1044 switches or changes the transmission frequency when it receives the transmission frequency switching signal from the operating unit 102. The switching of the transmission frequency is carried out after the operation signal that informs the receiver 200 of switching of the transmission frequency is transmitted to the receiver 200.

The transmitter 100 sends the operation signal at the transmission frequency maintained in step S806, or the transmission frequency set in step S808 (step S810). For example, the transmitting unit 1046 sends the operation signal produced by the transmission signal producing unit 1042, at the transmission frequency set by the transmission frequency setting unit 1044.

Operation of Receiver FIG. 9 illustrates the operation of the receiver 200.

The receiver 200 receives an operation signal from the transmitter 100 (step S902). For example, the receiving unit 2042 receives the operation signal transmitted from the transmitter 100.

The receiver 200 determines whether the operation signal was transmitted in response to the user's operation to press an operating button for a long time (step S904). For example, the received signal analyzing unit 2044 may determine whether a flag bit is set at a given bit position of the operation signal. In this embodiment, it is determined that the operation signal was transmitted in response to the user's operation to press the operating button for a long time, when the flag bit is set at the given bit position of the operation signal.

If the operation signal was transmitted in response to the operation to press the operating button for a long time (step S904: YES), the receiver 200 sets a long-press no-radio-wave timer time (T1) (step S906). For example, the no-radio-wave timer time setting unit 2046 sets the long-press no-radio-wave timer time.

If, on the other hand, the operation signal was not transmitted in response to the operation to press the operating button for a long time (step S904: NO), the receiver 200 sets a short-press no-radio-wave timer time (T2) (step S908). For example, the no-radio-wave timer time setting unit 2046 sets the short-press no-radio-wave timer time.

The receiver 200 receives the operation signal from the transmitter 100, using the no-radio-wave timer set in step S906 or step S908 (step S910). For example, the no-radio-wave timer set by the no-radio-wave timer time setting unit 2046 is fed to the receiving unit 2042, and the receiving frequency set by the receiving frequency setting unit 2048 is set in the receiving unit 2042. The receiving unit 2042 receives the operation signal transmitted from the transmitter 100, at the receiving frequency set by the receiving frequency setting unit 2048. When the operation signal is received, the no-radio-wave timer set by the no-radio-wave timer time setting unit 2046 is set.

Modified Examples Transmitter, Receiver While the transmission frequency is switched between two frequencies in the above-described embodiment, the transmission frequency may be switched among three or more frequencies. For example, the transmitter 100 and the receiver 200 may be arranged to communicate with each other at a transmission frequency selected from M (M is an integer larger than 2 (M>2)) levels of frequencies.

In the case where the transmitter 100 and the receiver 200 are arranged to be able to communicate with each other at M levels of transmission frequencies, too, the transmitter 100 and the receiver 200 are constructed as shown in FIG. 1, FIG. 2 and FIG. 4.

For example, when the wireless communication system has transmission frequencies f1, f2, 13, . . . , and fM, the transmission frequency is sequentially switched in the order of f1, f2, f3, . . . , fM each time the user presses the operating button for a short time. By specifying the order in which the transmission frequency is switched, the transmission frequency setting unit 1044 can set the desired or intended transmission frequency.

Also, the no-radio-wave timer time setting unit 2046 sets the short-press no-radio-wave timer time when the transmission frequency is switched or changed, and sets the long-press no-radio-wave timer time when the transmission frequency is not switched. Since the order in which the transmission frequency is switched is known, the receiving frequency setting unit 2046 can switch the receiving frequency in the same order in which the transmission frequency is switched.

Operations of Transmitter and Receiver The transmitter 100 and receiver 200 of the modified example operate according to the flowcharts of FIG. 8 and FIG. 9, respectively. This is because the order in which the transmission frequency is switched is specified even though the transmission frequency is selected from three or more frequencies.

While a flag bit is set at a given position of an operation signal produced when the user presses an operating button for a long time in the above-described embodiment, a flag bit may be set at a given position of an operation signal produced when the user presses an operating button for a short time. When the receiver detects the flag bit, it determines that the operation signal was produced in response to the user's operation to press the operating button for a short time.

Instead of setting a flag bit at a given position of an operation signal produced when the user presses an operating button for a long time as in the above-described embodiment, the receiver may count the receiving time or duration for which it receives the operation signal. If the receiving time is equal to or longer than a predetermined length of time, it is determined that the operation signal received by the receiver was produced in response to the user's operation to press the operating button for a long time. If the receiving time is shorter than the predetermined length of time, it is determined that the received operation signal was produced in response to the user's operation to press the operating button for a short time. With this arrangement in which the receiver counts the receiving time for which the operation signal is received, the number of bits of the operation signal can be reduced.

The receiver as described below is provided according to the illustrated embodiment of the invention.

The receiver, which receives a radio signal transmitted from a transmitter, includes a receiving unit that receives a signal that is wirelessly transmitted from the transmitter at one of a plurality of transmission frequencies, a receiving frequency change determining unit in the form of a received signal analyzing unit that determines whether a receiving frequency is to be changed, based on the signal received by the receiving unit, and a communication error acceptance time setting unit in the form of a no-radio-wave timer time setting unit that sets an acceptance time as a period of time for which communication errors after confirmation of a receiving operation are accepted, based on the signal received by the receiving unit. The communication error acceptance time setting unit sets the acceptance time to different periods of time, depending on whether the receiving frequency change determining unit determines that the receiving frequency is to be changed.

By setting the acceptance time to different periods of time, depending on whether it is determined that the receiving frequency is to be changed, it is possible to set the acceptance time to appropriate time periods for the case where the receiving frequency is to be changed, and the case other than the case where the receiving frequency is to be changed. Since the multi-channel system inevitably involves an operation to switch the receiving frequency, a great advantageous effect is provided by appropriately setting the error acceptance time when the receiving frequency is changed. It is also possible to reduce wireless communication errors due to disturbance noise, by setting the error acceptance time.

Furthermore, the communication error acceptance time setting unit sets the acceptance time for which communication errors are accepted after processing of a frame is confirmed, such that the acceptance time set in the case where the receiving frequency change determining unit determines that the receiving frequency is to be changed is shorter than the acceptance time set in the case where the receiving frequency change determining unit does not determine that the receiving frequency is to be changed.

The error acceptance time set in the case where it is determined that the receiving frequency is to be changed is set to a shorter period of time than the error acceptance time set in the case where it is not determined that the receiving frequency is to be changed, so that the standby frequency can be changed at an earlier opportunity, and communication errors in the signal transmitted at the frequency that has been changed by the transmitter can be reduced.

Furthermore, the receiving frequency change determining unit determines whether the receiving frequency is to be changed, based on whether a flag bit is included in the signal received by the receiving unit.

Furthermore, the determination as to whether the flag bit is included in the signal received by the receiving unit is made depending on whether an operating button on the transmitter is pressed for a long time.

By using the flag bit included in the signal received by the receiver, the transmitter can inform the receiver whether the received signal was produced in response to the user's operation to press the operating button for a long time, or the received signal was produced in response to the user's operation to press the operating button for a short time.

The wireless communication system as described below is provided according to the illustrated embodiment of the invention.

In the wireless communication system including a transmitter, and a receiver that receives a radio signal transmitted from the transmitter, the transmitter wirelessly transmits a signal at one of a plurality of transmission frequencies, and the receiver includes a receiving unit that receives the signal wirelessly transmitted from the transmitter, a receiving frequency change determining unit that determines whether a receiving frequency is to be changed, based on the signal received by the receiving unit, and a communication error acceptance time setting unit that sets an acceptance time as a period of time for which communication errors after confirmation of a receiving operation are accepted, based on the signal received by the receiving unit. The communication error acceptance time setting unit sets the acceptance time to different periods of time, depending on whether the receiving frequency change determining unit determines that the receiving frequency is to be changed.

The signal receiving method as described above is provided according to the illustrated embodiment of the invention.

The signal receiving method of receiving a radio signal transmitted from a transmitter has a receiving step of receiving a signal that is wirelessly transmitted from the transmitter at one of a plurality of transmission frequencies, a receiving frequency change determining step of determining whether a receiving frequency is to be changed, based on the signal received in the receiving step, and a communication error acceptance time setting step of setting an acceptance time as a period of time for which communication errors after confirmation of a receiving operation are accepted, based on the signal received in the receiving step. In the communication error acceptance time setting step, the acceptance time is set to different periods of time, depending on whether it is determined in the receiving frequency change determining unit that the receiving frequency is to be changed.

While the invention has been described with reference to particular embodiments thereof, each of the embodiments is a mere example, and those skilled in the art will understand various modified examples, corrections, alternatives, replacements, and so forth. While the system according to one embodiment of the invention has been described using the functional block diagrams, the system may be implemented by hardware, software, or a combination thereof. It is to be understood that the invention is not limited to the illustrated embodiments, but may be embodied with various modifications, corrections, alternatives, replacements, and so forth, without departing from the spirit of the invention.

The invention claimed is:

1. A receiver that receives a radio signal transmitted from a transmitter, comprising:
   a receiving unit that receives a signal that is wirelessly transmitted from the transmitter at one of a plurality of transmission frequencies;
   a receiving frequency change determining unit that determines whether a receiving frequency is to be changed, based on the signal received by the receiving unit; and
   a communication error acceptance time setting unit that sets an acceptance time as a period of time for which communication errors after confirmation of a receiving operation are accepted, based on the signal received by the receiving unit, wherein
   the communication error acceptance time setting unit sets the acceptance time to different periods of time, depending on whether the receiving frequency change determining unit determines that the receiving frequency is to be changed.

2. The receiver according to claim 1, wherein the communication error acceptance time setting unit sets the acceptance time for which communication errors are accepted after processing of a frame is confirmed, such that the acceptance time set in the case where the receiving frequency change determining unit determines that the receiving frequency is to be changed is shorter than the acceptance time set in the case where the receiving frequency change determining unit does not determine that the receiving frequency is to be changed.

3. The receiver according to claim 1, wherein the receiving frequency change determining unit determines whether the receiving frequency is to be changed, based on whether a flag bit is included in the signal received by the receiving unit.

4. The receiver according to claim 3, wherein the determination as to whether the flag bit is included in the signal received by the receiving unit is made depending on whether an operating button on the transmitter is pressed for a long time.

5. The receiver according to claim 1, wherein the receiving frequency change determining unit determines whether the receiving frequency is to be changed, based on a receiving time as a period of time for which the signal is received by the receiving unit.

6. A wireless communication system including a transmitter, and a receiver that receives a radio signal transmitted from the transmitter, wherein
the transmitter wirelessly transmits a signal at one of a plurality of transmission frequencies;
the receiver includes a receiving unit that receives the signal wirelessly transmitted from the transmitter, a receiving frequency change determining unit that determines whether a receiving frequency is to be changed, based on the signal received by the receiving unit, and a communication error acceptance time setting unit that sets an acceptance time as a period of time for which communication errors after confirmation of a receiving operation are accepted, based on the signal received by the receiving unit; and
the communication error acceptance time setting unit sets the acceptance time to different periods of time, depending on whether the receiving frequency change determining unit determines that the receiving frequency is to be changed.

7. A signal receiving method according to which a receiver receives a radio signal transmitted from a transmitter, comprising:
receiving a signal that is wirelessly transmitted from the transmitter at one of a plurality of transmission frequencies;
determining whether a receiving frequency is to be changed, based on the received signal; and
setting an acceptance time as a period of time for which communication errors after confirmation of a receiving operation are accepted, based on the received signal, wherein the acceptance time is set to different periods of time, depending on whether it is determined that the receiving frequency is to be changed.

\* \* \* \* \*